United States Patent [19]
Zechmann et al.

[11] Patent Number: 5,645,097
[45] Date of Patent: Jul. 8, 1997

[54] CONTROL CIRCUIT FOR A SOLENOID VALVE

[75] Inventors: Jürgen Zechmann, Heilbronn; Berend-Wilhelm Doden, Ludwigsburg; Michael Wolf, Kornwestheim; Helmut Wiss, Möglingen, all of Germany

[73] Assignee: Robert Bosch GmbH, Stuttgart, Germany

[21] Appl. No.: 325,227

[22] PCT Filed: Feb. 8, 1994

[86] PCT No.: PCT/DE94/00124

§ 371 Date: Oct. 21, 1994

§ 102(e) Date: Oct. 21, 1994

[87] PCT Pub. No.: WO94/19810

PCT Pub. Date: Sep. 1, 1994

[30] Foreign Application Priority Data

Feb. 23, 1993 [DE] Germany .......................... 43 05 488.9

[51] Int. Cl.$^6$ ...................................................... F16K 31/06
[52] U.S. Cl. .................... 137/1; 251/129.01; 251/129.05
[58] Field of Search ........................ 137/1; 251/129.01, 251/129.05, 129.15

[56] References Cited

U.S. PATENT DOCUMENTS

| 4,766,921 | 8/1988 | Williams | 251/129.05 X |
| 5,435,145 | 7/1995 | Jaster | 251/129.05 X |

FOREIGN PATENT DOCUMENTS

| 0376493A1 | 7/1990 | European Pat. Off. . |
| 2242758 | 3/1975 | France . |
| 4110254 | 10/1992 | Germany . |

*Primary Examiner*—Kevin Lee
*Attorney, Agent, or Firm*—Kenyon & Kenyon

[57] ABSTRACT

A solenoid valve control circuit for controlling an actuation current of a solenoid valve when the valve is to be adjusted from its flow-permitting position into its closed position so that the actuation current is initially adjusted to a value beyond the current value at which the valve begins to drop out. However, the actuation current is subsequently adjusted back to the range which lies between the current value at which the valve goes into the closed position and the current value at which the valve goes into its flow-permitting position.

7 Claims, 1 Drawing Sheet

CONTROL CIRCUIT FOR A SOLENOID VALVE

FIELD OF THE INVENTION

The present invention relates to a solenoid valve control circuit, in particular, to a control circuit for controlling the actuation current of a solenoid valve.

BACKGROUND OF THE INVENTION

Published German Patent Application No. 41 10 254 A1 describes how a solenoid valve actuation current is to be interrupted once or a plurality of times when actuating the valve in order to achieve a more gentle closing of the valve and to avoid disturbing hydraulic noises.

SUMMARY OF THE INVENTION

According to the principles of the control circuit and method of the present invention, a solenoid valve actuation current is generated so that upon actuation of the valve, initial heavy impacting of the valve body against the stop is avoided, because the travel is executed less quickly. Also, the hydraulic vibrations which otherwise occur during opening are not produced and thus a significant reduction in noise emission is achieved. This is of particular interest with, e.g., Anti-lock Braking System (ABS) and Anti-Spin Regulation (ASR) valves.

With a further refinement of the present invention, the level of the subsequent compression stage and the pressure-change gradient can be influenced.

DETAILED DESCRIPTION

Figure 1:
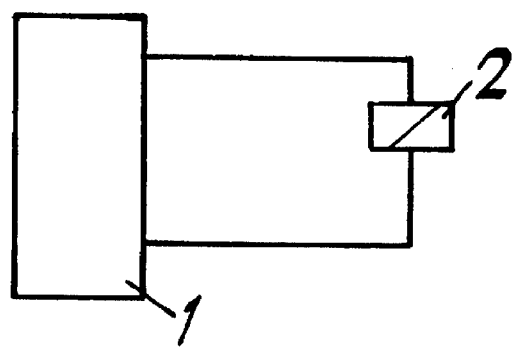
FIG. 1 is a schematic representation of a control circuit, in accordance with the present invention, coupled to a solenoid valve.

FIG. 1 shows an embodiment of a control circuit 1, of the present invention, coupled to a solenoid valve 2.

Figure 2:
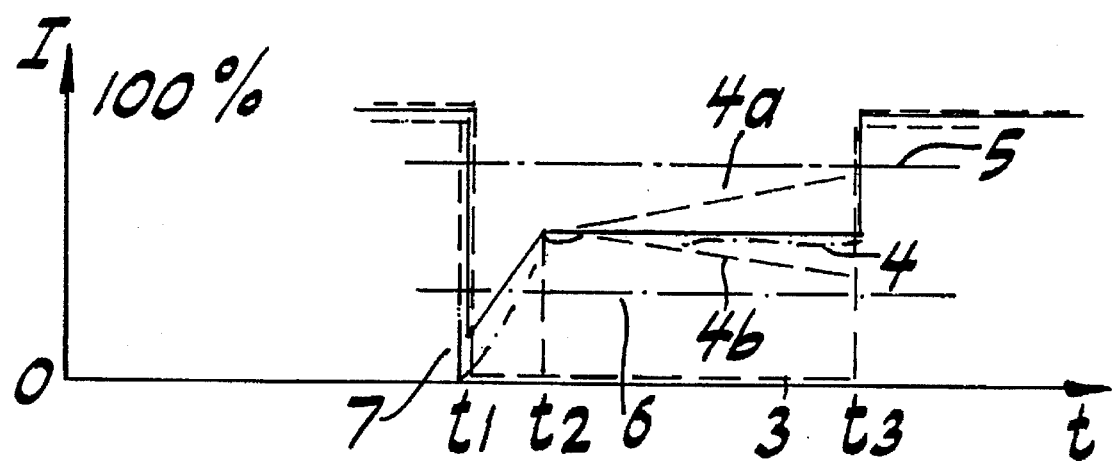
FIG. 2 shows the actuation current generated by the control circuit of the present invention as a function of time.

FIG. 2 shows with broken lines the variation 3 in the customary actuation current between two actuation pulses. The actuation current, controlled according to the present invention, between the two actuation pulses is shown by a solid line. In FIG. 2, the actuation current value 5 at which the solenoid valve 2 is triggered (is closed), is shown by a dot-dash line, as is the actuation current value 6 at which the valve drops out (opens). When the valve is switched off, and begins to open, at the time $t_1$, the actuation current is not adjusted to 0, but rather to a value which is below the value 6 and constitutes, e.g., 20–30% of the actuation for the closed position. Thus, the valve begins to drop out. However, the actuation current 4 is immediately adjusted back again to the range between the current values 5 and 6 and maintained there (starting from $t_2$) until the valve is to be moved back into the closed position ($t_3$). This provides the advantages mentioned at the beginning. However, it is also possible to allow the actuation current to rise slowly in accordance with the dashed line 4a or to allow it to drop out slowly in accordance with the dashed line 4b.

In another embodiment of the present invention, the actuation current may be briefly reduced to 0 at time t1 before being adjusted to a level between that of levels 5 and 6, as shown by line 7 of FIG. 2. In yet another embodiment of the present invention, the actuation current may be pulse width modulated.

The process has been illustrated with reference to straight lines, but can also be realized with any desired curve forms.

What is claimed is:

1. A method for controlling a solenoid valve, comprising the steps of:

adjusting the valve from a closed position to an open position when an actuation current reaches a first actuation current value; and adjusting the valve from the open position to the closed position when the actuation current reaches a second actuation current value;

wherein, when the valve is adjusted to the open position, the actuation current is initially briefly adjusted beyond the first actuation current value and subsequently adjusted to a level between the first actuation current value and the second actuation current value.

2. The method according to claim 1, wherein:

the solenoid valve is in the closed position when the actuation current is at a maximum actuation current value; and the actuation current is briefly reduced to 0.

3. The method according to claim 1, wherein:

the solenoid valve is in the closed position when the actuation current is at a maximum actuation current value; and the actuation current is briefly reduced to approximately 30% of the maximum actuation current value.

4. The method according to claim 1, wherein after the actuation current is increased to between the first and second current values, the actuation current is kept constant for a second predetermined period of time.

5. The method according to claim 1, wherein after the actuation current is increased to between the first and second current values, the actuation current is changed with a predetermined small gradient.

6. The method according to claim 1, wherein after the actuation current is increased to between the first and second current values, the actuation current is kept between the first and second current values until the actuation current is increased to adjust the solenoid valve into the closed position.

7. The method according to claim 1, wherein the actuation current is pulse-width-modulated.

* * * * *